(12) United States Patent
Chanda et al.

(10) Patent No.: US 8,577,754 B1
(45) Date of Patent: Nov. 5, 2013

(54) IDENTIFYING LOW UTILITY ITEM-TO-ITEM ASSOCIATION MAPPINGS

(75) Inventors: Gaurav Chanda, Seattle, WA (US); Ronald M. Whitman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 325 days.

(21) Appl. No.: 12/950,959

(22) Filed: Nov. 19, 2010

(51) Int. Cl.
   *G06Q 30/00* (2012.01)
(52) U.S. Cl.
   USPC .................. 705/26.7; 705/26.1; 705/27.1
(58) Field of Classification Search
   USPC ........................... 705/26.1, 27.1, 26.7
   See application file for complete search history.

(56) References Cited

U.S. PATENT DOCUMENTS

| | | | |
|---|---|---|---|
| 6,912,505 B2 * | 6/2005 | Linden et al. | 705/14.53 |
| 6,963,850 B1 | 11/2005 | Bezos et al. | |
| 7,133,848 B2 * | 11/2006 | Phillips et al. | 705/400 |
| 7,720,720 B1 * | 5/2010 | Sharma et al. | 705/26.7 |
| 2002/0199194 A1 | 12/2002 | Ali | |
| 2004/0083232 A1 | 4/2004 | Ronnewinkel et al. | |
| 2005/0038717 A1 | 2/2005 | McQueen, III et al. | |
| 2005/0076093 A1 | 4/2005 | Michelitsch et al. | |
| 2008/0004989 A1 | 1/2008 | Yi | |
| 2008/0215349 A1 * | 9/2008 | Baran et al. | 705/1 |
| 2009/0281923 A1 * | 11/2009 | Selinger et al. | 705/27 |

OTHER PUBLICATIONS

"Effects of Daily and "Woot-off" strategies on e-commerce," by Bin Wang, Lai C. Liu, Kai S. Koong, and Shuming Bai, Industrial Management and Data Systems, vol. 109, No. 3, 2009, pp. 389-403.*
Young-Woo Seo and Byoung-Tak Zhang, "A Reinforcement Learning Agent for Personalized Information Filtering," Proceedings of the 5th International Conference on Intelligent User Interfaces, 2000, pp. 248-251 (ISBN:1-58113-134-8).
U.S. Appl. No. 11/769,586, filed Jun. 27, 2007 (copies of application text, drawings and filing receipt provided).

* cited by examiner

*Primary Examiner* — Jeffrey A Smith
*Assistant Examiner* — Anne Georgalas
(74) *Attorney, Agent, or Firm* — Knobbe, Martens, Olson & Bear, LLP

(57) ABSTRACT

A process is disclosed for using item price data to assess whether particular item-to-item associations are useful for generating item recommendations. In one embodiment, the process involves generating a compatibility score that represents a degree to which the two items of an item-to-item mapping are compatible in price. This score may then be used to determine whether to use the item-to-item association as a basis for generating item recommendations.

24 Claims, 3 Drawing Sheets

IDENTIFYING LOW UTILITY ITEM-TO-ITEM ASSOCIATION MAPPINGS

BACKGROUND

1. Field of the Invention

The present invention relates to information filtering and data mining. More specifically, the invention relates to computer-based systems and methods for determining the relatedness between products or other viewable items represented within a database, and for using item relatedness data combined with price data to select items to recommend to users.

2. Description of the Related Art

A recommendation service is a computer-implemented service that recommends items to users from a database of items. The recommendations are customized to particular users based on information known about the users. One common application for recommendation services involves recommending products to online customers. For example, shopping sites commonly provide services for recommending products (books, compact discs, videos, etc.) to customers based on item viewing histories, purchase histories, item ratings, and/or other behaviors of the customers.

Some recommendation systems identify items that are related to one another based on the monitored behaviors of users. See, e.g., U.S. Pat. No. 7,685,074. The item relationships are determined by analyzing user purchase histories, product viewing histories, and/or other types of recorded behavioral data reflecting users' interests in particular items. This process may be repeated periodically (e.g., once per day or once per week) to incorporate the latest browsing activities of users. The resulting item-to-item mappings may be used to provide item recommendations to users in various contexts. For example, the item-to-item mappings may be used to supplement product detail pages of an electronic catalog with lists of related items, and/or may be used to generate personalized recommendations for particular users.

DETAILED DESCRIPTION OF SPECIFIC EMBODIMENTS

Recommendation services of the type described above typically do not give appropriate weight, if any, to item price data. As a result, the recommendations provided to users are sometimes poor given the context of the user's shopping or browsing session. For example, a digital camera priced over $400 may be recommended to a user who is viewing memory cards priced at less than $40. It is not likely that a user will find such a recommendation useful.

To address this problem, a computer-implemented process is disclosed for using price data to assess the quality or usefulness of particular item-to-item association mappings. In one embodiment, this process involves detecting a behavior-based relationship between two items (or in some embodiments, a content-based relationship), and calculating a price compatibility score that represents a degree to which the two items are compatible in price. The price compatibility score is then used to determine whether to use the item-to-item relationship mapping as a basis for generating item recommendations for one or more users. The score may additionally or alternatively be used to appropriately weight the item-to-item relationship for purposes of generating recommendations, such that less weight is given as the degree of price incompatibility increases.

The embodiments described below build on, but are not limited to, the recommendation processes described in U.S. Pat. No. 7,685,074, entitled DATA MINING OF USER ACTIVITY DATA TO IDENTIFY RELATED ITEMS IN AN ELECTRONIC CATALOG, the disclosure of which is hereby incorporated by reference.

Figure 1:
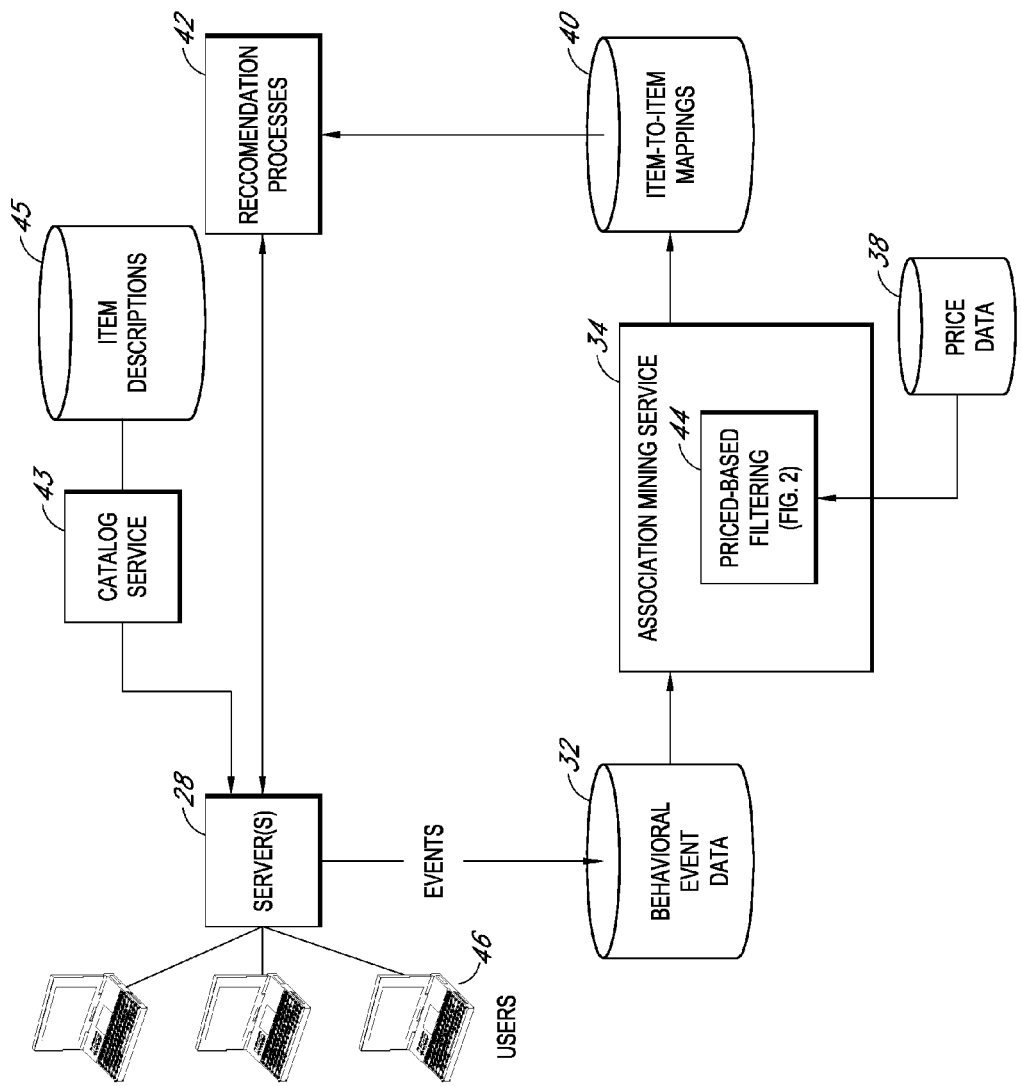
FIG. 1 illustrates a system that uses price data to filter out low-utility item-to-item association mappings according to one embodiment.

FIG. 1 illustrates a recommendation system according to certain embodiments. The recommendation system, may, for example, be part of an interactive system, such as a web site, that enables users to browse an electronic catalog or other repository of items. The items may, for example, be products available for purchase or rental, digital works (e.g., music and/or video files) available for download, news and magazine articles available for viewing, blog postings, television shows, podcasts, authors, and/or any other type of item that can be stored or represented in a database. For purposes of illustration, the recommendation system will be described primarily in the context of a web site that provides functionality for users to browse and make purchases from an electronic catalog; however, as will be recognized, the disclosed recommendation system and methods may also be used in numerous other environments.

As illustrated in FIG. 1, the system includes one or more servers 28, such as web servers, that provide user access to an electronic catalog of items represented in a database or collection of databases. The items may include or consist of items that may be purchased via the web site (e.g., book, music, and video titles in physical or downloadable form; consumer electronics products; household appliances; apparel items, magazine and other subscriptions, etc.). The database may also store data regarding how the items are arranged within a hierarchical browse structure. Data regarding the catalog items and the browse structure is accessible via a catalog service 43 that provides access to descriptions 45 of the various items available for purchase. As is conventional, the electronic catalog may include a distinct item detail page (also referred to as a product detail page) for each item that is available for purchase.

As users browse and make purchases of items represented in the electronic catalog, the system records one or more types of item selection events in a data repository 32, which may include multiple distinct log files or databases. The item selection events may include, for example, item purchase events, item viewing events (which may be based on visits to item detail pages), "shopping cart add" events, "wish list add" events, item-review submission events, item rating events, and/or any other type of user action that evidence users' interests in particular catalog items. The recorded events or event histories are analyzed by an association mining service 34 to detect behavioral relationships (also called "behavioral associations") between particular items. For example, if a relatively large fraction of those who view item A also view item B during the same session, the association mining service 34 may generate an item-to-item association mapping between these two items. The item-to-item associations may be detected using any of a variety of methods that are known in the art, including the methods described in U.S. Pat. Nos.

7,685,074 and 7,827,186. Although the associations are typically based on monitored user behaviors, they may additionally or alternatively be based on similarities between item attributes or content.

These item-to-item association mappings are recorded in a data repository 40, and are used by one or more recommendation processes 42 to provide item recommendations to users. Each item-to-item mapping maps a particular "source" item to a particular "target" item, and may be used as a basis for recommending the target item to users. For example, a mapping of item A to item B may be used as basis to recommend item B to users who purchase, view, or favorably rate item A. As described in U.S. Pat. No. 7,685,074, referenced above, different datasets of item-to-item mappings may be generated based on different types of user behaviors (purchases, item viewing events, etc.), and these datasets may be used in various contexts to provide recommendations to users. For example, the item detail pages of the catalog may automatically be supplemented with "related items" lists of the following format: "customers who viewed this item also viewed . . . ," "customers who purchased this item also purchased . . . ," and/or "customers who viewed this item ultimately purchased . . . " As another example, the item-to-item mappings may be used to provide personalized recommendations that are based on a particular user's past purchases and/or other item-specific actions.

As shown in FIG. 1, the association mining service 34 preferably includes a price-based filtering component 44 that filters out item-to-item relationships for which the items are determined to be incompatible in price. Examples of particular price compatibility scoring functions that may be used for this purpose are described below. In the illustrated embodiment, the price-based filtering component 44 operates by preventing certain item-to-item mappings from being added to the data repository 40 of item-to-item mappings. However, various alternatives are possible. For example, in some embodiments, all of the item-to-item mappings (including those between items that are highly incompatible in price) may be retained in the database 40 together with their associated price compatibility scores; the recommendation processes 42 may then use these scores to selectively ignore, or to accord lesser weight to, particular item-to-item mappings.

As yet another example, the task of assessing price compatibility may alternatively be performed in real time when recommendations are generated, such that the assessments reflect the latest price data. For instance, when a user selects an item for viewing in the catalog, a recommendation process 42 may initially look up from the database 40 a list of items having the strongest purchase-based (or other behavior-based) association with the selected item. For each item in this list, the recommendation process 42 may then generate a respective price compatibility score representing the degree to which that item is compatible in price as a target of the selected item. The recommendation process 42 may then filter this list to remove items that are deemed incompatible in price, and/or may use the scores to rank the list for display to the user.

The recommendation process or processes 42 may use the filtered set of item-to-item mappings in various ways to provide recommendations to users. For example, one process 42 may supplement item detail pages of the catalog with lists of related items, while another recommendation process 42 may generate personalized recommendations that are personalized based on the known item interests of the target user. Yet another recommendation process 42 may use the mappings to select pair or other groups of items to suggest as a bundle. The various types of recommendations may be incorporated into dynamically generated web pages that are served by the server 28 to user computing devices 46.

Figure 2:
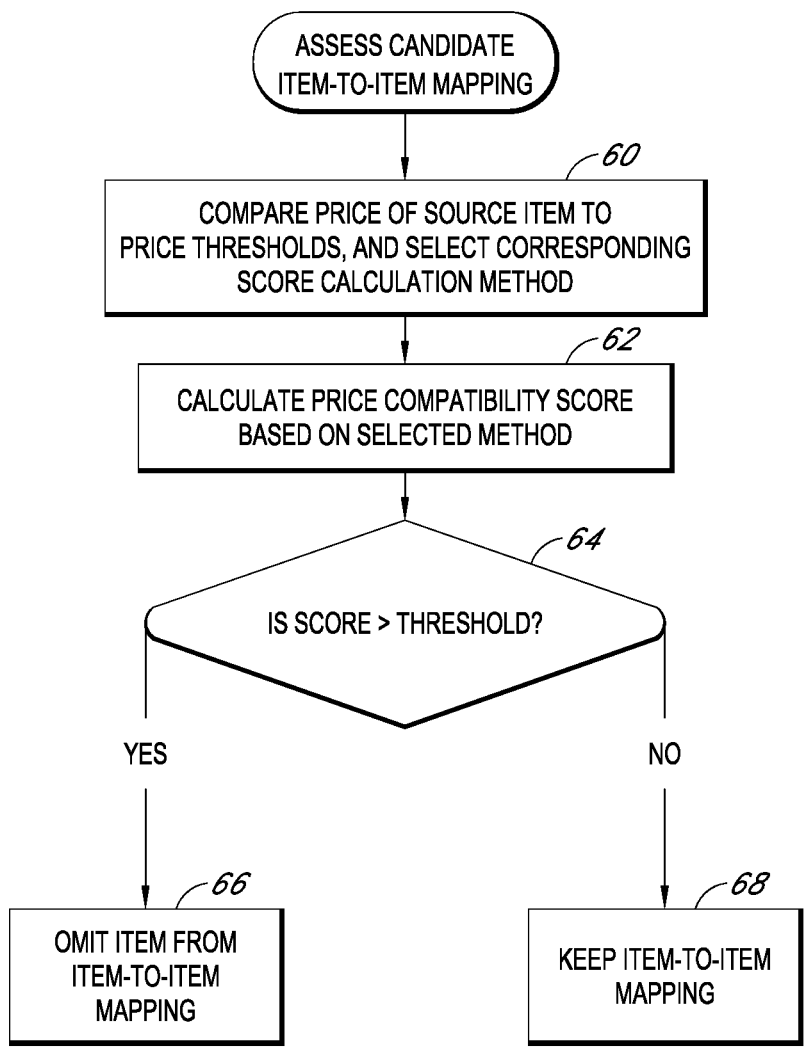
FIG. 2 illustrates a sequence of steps performed by one embodiment of the price-based filtering component of FIG. 1 to assess whether a particular item-to-item association mapping should be filtered out.

FIG. 2 illustrates one embodiment of a process that may be used by the price-based filtering component 44 of FIG. 1 to assess whether a particular item-to-item association mapping should be used as a basis for providing recommendations. This process may be applied to each item-to-item association detected by the association mining service 34, and may be applied either as particular item-to-item associations are detected or at some later point in time. As explained above, each item-to-item association is in the form of a mapping of a particular source item to a particular target item. The item-to-item associations may be based on the purchase histories, item viewing histories, and/or other recorded behaviors of users. The process shown in FIG. 2 may also be used to assess content-based item-to-item associations detected via an analysis of item attributes or content.

In one embodiment, the process illustrated in FIG. 2 is only performed on item pairings in which the source item maps to a more expensive target item. Thus, item pairings in which a relatively high priced item maps to a much lower priced item are retained. As a result, a user's selection of a relatively high priced item may result in recommendations of much lower priced items, but not the reverse.

In another embodiment, the process of FIG. 2 is performed on all item-to-item associations. Thus, mappings of relatively high priced items to much lower priced items are also filtered out. For example, a mapping of a $1000 designer handbag to a small $10 change purse may be filtered out, such that a user's selection of the designer handbag will not result in a recommendation of the change purse.

In block 60 of FIG. 2, the process initially compares the price of the source item to one or more price thresholds. (Either retail prices or list prices are preferably used for this comparison and the score calculations described below, although other price data, such as average prices, may alternatively be used.) The purpose of this comparison is to select an appropriate score calculation method for generating an incompatibility score. In one embodiment, two thresholds are used: a lower threshold and an upper threshold. The lower threshold may, for example, be in the range of $5 to $30, and the upper threshold may, for example, be in the range of $80 to $150. For instance, price thresholds of $10 and $100 may be used. When the source item's price is below the lower threshold, a first score calculation method is used. As shown in equation 1, this first score calculation method takes the ratio of the target item's price ($P_T$) to the source item's price ($P_S$). Higher scores represent higher degrees of price incompatibility.

$$\text{Incompatibility Score} = P_T/P_S \quad (\text{Eq. 1})$$

When the source item's price exceeds the upper price threshold, a second score calculation method (represented by equation 2) is used. This method compares the difference between the two prices to the price of the source item.

$$\text{Incompatibility Score} = 100(P_T - P_S)/P_S \quad (\text{Eq. 2})$$

When the source item's price is neither less than the lower threshold nor above the upper threshold, a third calculation method is used. This third calculation method is preferably a blend of scores produced by equations 1 and 2. The two scores can be blended by solving the following two linear equations, where a1, b1, a2 and b2 are unknowns:

$$c1(x) = a1(x) + b1$$

$$c2(x) = a2(x) + b2$$

The conditions are as follows, where $P_{low}$ is the low price threshold and $P_{high}$ is the high price threshold:

$$a1(P_{low})+b1=1$$

$$a1(P_{high})+b1=0$$

$$a2(P_{low})+b2=0$$

$$a2(P_{high})+b2=1$$

The blended function, therefore, becomes:

$$\text{Incompatibility score}=c1(P_S)(P_T/P_S)+c2(P_S)(100(P_T-P_S)/P_S). \quad \text{(Eq. 3)}$$

These particular equations are based on an observation that the ratio between the respective prices of the two items is a good measure of compatibility for relatively low priced items, but is not as useful as a compatibility measure for relatively high priced items. As item price increases, the difference between the two prices becomes an increasingly helpful factor in assessing compatibility. Thus, equation 1 considers the ratio of the two prices, while equation 2 considers the price difference (relative to the price of the source item). Equation 3, which is applied when the source item falls in the medium-price range, considers both the price ratio and the difference between the two prices.

As will be apparent, a greater or lesser number of price thresholds and associated score calculation methods may alternatively be used. In addition, any of a variety of alternative score calculation methods may be used, including methods that take into consideration the category or categories of the items involved or other non-price attributes of the items.

As depicted in blocks 62 and 64 of FIG. 2, once the appropriate score calculation method is selected, the incompatibility score is calculated and is compared to a score threshold. For the equations shown, a score threshold in the range of 5 to 15, such as a threshold of 10, may be used. Different thresholds may be used for different categories of products. If the calculated score is higher than the threshold score, the item-to-item mapping is dropped (omitted or removed from the data repository 40), as shown in block 66. Dropping the item-to-item mapping prevents it from being used as a basis for recommending the target item. If the calculated score is equal to or lower than the threshold score, the item-to-item mapping is kept (block 68), and is therefore available to the recommendation processes 42 as a basis for recommending the target item. Other criteria, such as the strength of the behavior-based association between the two items, may also be considered in determining whether to filter out the item-to-item mapping.

As an alternative to using multiple calculation methods to calculate the incompatibility scores in block 62, the score threshold used in block 62 may be selected or adjusted based on the price of the source item. For instance, equation 1 (the "ratio of prices" method) may be used for all item-to-item pairings, but a larger threshold (ratio) may be permitted where the price of the source item is relatively small.

As mentioned above, the incompatibility scores may, in some embodiments, be stored in the item-to-item mapping database 40 in association with the respective item-to-item mappings. This enables the recommendation processes 42 to consider the scores in determining whether, or how much, to rely on particular item-to-item mappings in generating recommendations. In these embodiments, all of the item-to-item mappings (including those with high incompatibility scores) may be retained in the data repository 40.

EXAMPLES

The following examples illustrate how the above equations may be applied.

Suppose the candidate item-to-item mapping maps a $4 memory card to a $400 digital camera, and that the lower and upper price thresholds are $10 and $100. In this example, the incompatibility score would be one hundred (based on equation 1). If a score threshold of ten is used in block 64 of FIG. 2, this item-to-item mapping would be filtered out. Thus, the digital camera would not be recommended to users as the result such users purchasing, viewing, favorably rating, or otherwise showing an interest in the memory card. For instance, if the $400 digital camera would otherwise appear as a related item on the item detail page for the memory card, the elimination of this item-to-item mapping would prevent this from occurring.

As a second example, suppose that a $200 item is mapped to a $300 item, and that the thresholds are the same as in the prior example. Applying equation 2 yields an incompatibility score of 50, which is greater than the threshold of 10, so this item-to-item mapping would again be filtered out.

In the above description, it is assumed that the item-to-item associations are "directional," meaning that each item pairing is a mapping of a source item to a target item. This, however, need not be the case. For instance, some recommendation systems generate and use non-directional item pairings. Thus, for example, if item A is paired with item B, this pairing may be used to recommend item B to a user who selects item A, and may also be used to recommend item A to a user who selects item B. Where such non-directional mappings are used, the lower priced item of the pair may be treated as the source item for purposes of blocks 60 and 62 of FIG. 2.

Detecting Item-to-Item Associations

As explained above, the process shown in FIG. 2 and described above may be applied to item associations detected through any of a variety of methods currently known or developed in the future. As one example, FIG. 3, which is reproduced from U.S. Pat. No. 7,685,074, illustrates a process that may be used by the association mining service 34 to detect item associations based on item viewing histories, and specifically item detail page visits, of users. The output of this process is a dataset of item-to-item mappings 40, in the form of a "similar items" table, that maps specific items to behaviorally related items. The process of FIG. 3 may be executed periodically, such as once per day or once per week, to update or regenerate the similar items table. Many other methods for identifying related items based on user behaviors and/or item attributes are known in the art, and any such method may be used in place of the method of FIG. 3.

Figure 3:
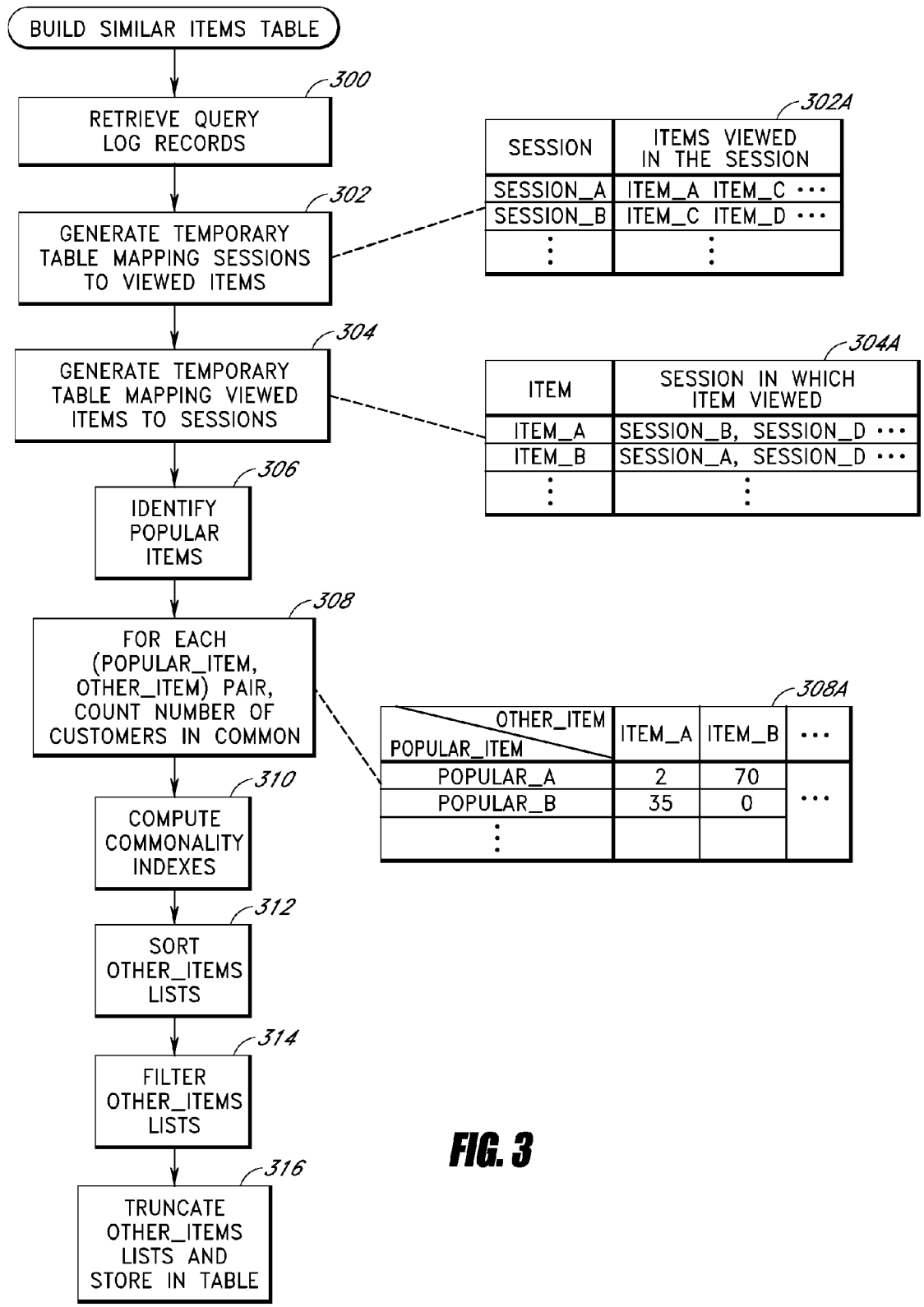
FIG. 3 illustrates a sequence of steps performed by the association mining service 34 of FIG. 1 to generate item-to-item association mappings.

As depicted by FIG. 3, the process initially retrieves the query log records for all browsing sessions (step 300). In one embodiment, only those query log records that indicate sufficient viewing activity (such as more than five items viewed in a browsing session) are retrieved from the behavioral event repository. In this embodiment, some of the query log records may correspond to different sessions by the same user. Preferably, the query log records of many thousands of different users are used to build the similar items table.

Each query log record is preferably in the general form of a browsing session identifier together with a list of the identifiers of the items viewed in that browsing session. The item IDs may be converted to title IDs during this process, or when the table 60 is later used to generate recommendations, so that different versions of an item are represented as a single item.

Each query log record may alternatively list some or all of the pages viewed during the session, in which case a look up table may be used to convert page IDs to item or product IDs.

In steps 302 and 304, the process builds two temporary tables 302A and 304A. The first table 302A maps browsing sessions to the items viewed in these sessions. Items that were viewed within an insignificant number (e.g., <15) of browsing sessions are preferably omitted or deleted from the tables 302A and 304A. In one embodiment, items that were viewed multiple times within a browsing session are counted as items viewed once within a browsing session.

In step 306, the process identifies the items that constitute "popular" items. This may be accomplished, for example, by selecting from table 304A those items that were viewed in more than a threshold number (e.g., 30) of sessions. In step 308, the process counts, for each (popular_item, other_item) pair, the number of sessions that are in common. A pseudocode sequence for performing this step is listed in Table 1. The result of step 308 is a table that indicates, for each (popular_item, other_item) pair, the number of sessions the two have in common. For example, in the hypothetical table 308A of FIG. 3B, POPULAR_A and ITEM_B have seventy sessions in common, indicating that in seventy sessions both items were viewed.

TABLE 1 for each popular_item
  for each session in sessions of popular_item
    for each other_item in items of session
      increment common-session-count(popular_item, other_item)

In step 310 of FIG. 3, the process generates the commonality indexes for each (popular_item, other_item) pair in the table 308A. The commonality index (CI) values are measures of the similarity or relatedness between two items, with larger CI values indicating greater degrees of similarity. The commonality indexes are preferably generated such that, for a given popular_item, the respective commonality indexes of the corresponding other_items take into consideration the following (a) the number of sessions that are common to both items (i.e, sessions in which both items were viewed), (b) the total number of sessions in which the other_item was viewed, and (c) the number of sessions in which the popular_item was viewed. Equation (4) may be used for this purpose, where $N_{common}$ is the number of sessions in which both A and B were viewed, $N_A$ is the number of sessions in which A was viewed, and $N_B$ is the number of sessions in which B was viewed. Other calculations that reflect the frequency with which A and B co-occur within the product viewing histories may alternatively be used.

$$CI(item\_A, item\_B) = N_{common}/\sqrt{(N_A \times N_B)} \quad \text{Equation (4)}$$

Following step 310 of FIG. 3, each popular_item has a respective "other_items" list which includes all of the other_items from the table 308A and their associated CI values. In step 312, each other_items list is sorted from highest-to-lowest commonality index. In one embodiment, the items in the other_items list are weighted to favor some items over others. For example, items that are new releases may be weighted more heavily than older items. For items in the other_items list of a popular_item, their CI values are preferably multiplied by the corresponding weights. Therefore, the more heavily weighted items (such as new releases) are more likely to be considered related and more likely to be recommended to users.

In step 316, the sorted other_items lists are truncated to length N (e.g., 20) to generate the similar items lists. Each similar items list is then stored in association with the identifier of the corresponding popular_item. If, for example, a given similar items lists includes twenty items (N=20), the list represents twenty item-to-item association mappings, each of which maps the popular_item with a respective similar item. Once the process of FIG. 3 is complete, the filtering process of FIG. 2 may be performed on the similar items table to remove low-utility pairings. In other embodiments, the processes of FIGS. 2 and 3 may be combined such that both price compatibility and item similarity are considered in combination (e.g., in a single step) to determine whether two items should be paired.

One variation of the method shown in FIG. 3 is to use multiple-session viewing histories of users (e.g., the entire viewing history of each user) in place of the session-specific product viewing histories. This may be accomplished, for example, by combining the query log data collected from multiple browsing sessions of the same user, and treating this data as one "session" for purposes of the FIG. 3 process. With this variation, the similarity between a pair of items, A and B, reflects whether a large percentage of the users who viewed A also viewed B—during either the same session or a different session.

Another variation is to use the "distance" between two product viewing events as an additional indicator of product relatedness. For example, if a user views product A and then immediately views product B, this may be treated as a stronger indication that A and B are related than if the user merely viewed A and B during the same session. The distance may be measured using any appropriate parameter that can be recorded within a session record, such as time between product viewing events, number of page accesses between product viewing events, and/or number of other products viewed between product viewing events.

All of the methods and tasks described above may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

For example, the functional components 34, 42, 43, 44, shown in FIG. 1 may be implemented by a programmed computer system that comprises one or more physical computers or computing devices. Different components may, but need not, be implemented on or by different machines. The various data repositories 32, 38, 40, 45 shown in FIG. 1 may be implemented as databases, flat files, and/or any other type of computer-based storage system. The program logic illustrated in FIGS. 2 and 3 may be embodied in code that is executed by one or more computing devices of the computer system. The executable code may be stored on one or more computer storage devices or media. The system shown in FIG. 1 may also include numerous other components for implementing other web site features, such as a product search engine, electronic wish lists, electronic shopping carts, product reviews and ratings, etc.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A computer-implemented method of identifying behavior-based item relationships that are useful for generating item recommendations, the method comprising:
    detecting a behavior-based relationship between a first item represented in an electronic catalog and a second item represented in the electronic catalog, said behavior-based relationship based on user activity data reflective of item selections of a plurality of users;
    selecting, based at least partly on a price of the first item, a price-compatibility score generation function from a plurality of price-compatibility score generation functions, wherein each price-compatibility score generation function corresponds to a different respective price range;
    calculating a price compatibility score with the selected price-compatibility score generation function, said price compatibility score representing a degree to which the first and second items are compatible in price;
    determining, based at least partly on the price compatibility score, to map the first item to the second item in an item-to-item mapping structure; and
    after determining to map the first item to the second item, using the item-to-item mapping structure to generate personalized item recommendations for each of multiple users;
    wherein each of the above-recited steps of said method is performed by a computer system that comprises one or more computers.

2. The method of claim 1, wherein the plurality of price-compatibility score generation functions include (1) a first price-compatibility score generation function that calculates a ratio between prices of the first and second items, and (2) a second price-compatibility score generation function that calculates a difference between prices of the first and second items.

3. The method of claim 1, further comprising using the item-to-item mapping structure to determine whether to list the second item on a detail page of the first item as part of a list of items that are related to the first item.

4. The method of claim 1, wherein selecting the price-compatibility score generation function comprises comparing the price of the first item to a price threshold that delineates two of the price ranges.

5. The method of claim 1, wherein calculating the price compatibility score comprises:
    generating the score with a first score generation function when the price of the first item is below a first threshold;
    generating the score with a second score generation function when the price of the first item is above a second threshold that is higher than the first threshold; and
    generating the score using a third score generation function when the price of the first item is neither below the first threshold nor above the second threshold.

6. The method of claim 1, wherein calculating the price compatibility score comprises calculating a ratio between the respective prices of the first and second items.

7. The method of claim 1, wherein calculating the price compatibility score comprises calculating a ratio between (a) the difference between the price of the second item and the price of the first item, and (b) the price of the first item.

8. The method of claim 1, further comprising using the price compatibility score to determine an amount of weight to give to the behavior-based relationship in generating item recommendations.

9. A system for identifying behavior-based item associations between items, the system comprising:
    a computer system comprising one or more computers, said computer system configured to at least:
        detect a behavior-based association between a first item represented in an electronic catalog and a second item represented in the electronic catalog, said behavior-based association based on user activity data reflective of item selections of a plurality of users;
        select, based at least partly on a price of the first item, a price-compatibility score generation function from a plurality of candidate price-compatibility score generation functions, wherein each price-compatibility score generation function corresponds to a different respective price range;
        calculate a compatibility score, using the selected price-compatibility score generation function, that represents a degree to which the first and second items are compatible in price; and
        determine, based at least partly on the compatibility score, to use the behavior-based association as a basis for recommending the second item to one or more users.

10. The system of claim 9, wherein the computer system is configured to determine, based at least partly on the compatibility score, whether to map the first item to the second item in an item-to-item mapping structure used to generate item recommendations for multiple users.

11. The system of claim 9, wherein the computer system is configured to determine, based at least partly on the compatibility score, whether to list the second item on a detail page of the first item as part of a list of items that are related to the first item.

12. The system of claim 9, wherein the computer system is configured to select the price-compatibility score generation function by determining the price range in which the price of the first item falls.

13. The system of claim 9, wherein the computer system is configured to calculate the compatibility score by a method that comprises:
    generating the compatibility score with a first price-compatibility score generation function when the price of the first item is below a first threshold;
    generating the compatibility score with a second price-compatibility score generation function when the price of the first item is above a second threshold that is higher than the first threshold; and
    generating the compatibility score using a third price-compatibility score generation function when the price of the first item is neither below the first threshold nor above the second threshold.

14. The system of claim 9, wherein a first of the plurality of price-compatibility score generation functions calculates a ratio between the respective prices of the first and second items.

15. The system of claim 9, wherein a first of the plurality of price-compatibility score generation functions calculates a ratio between (a) the difference between the price of the second item and the price of the first item, and (b) the price of the first item.

16. The system of claim 9, wherein the computer system is additionally configured to use the compatibility score to determine a non-zero amount of weight to give to the behavior-based association in generating item recommendations.

17. Non-transitory computer storage that stores executable code that directs a computer system to at least:
- identify an item-to-item mapping of a first item to a second item, said item-to-item mapping based at least partly on a behavior-based association detected from monitored actions of a plurality of users of an electronic catalog of items;
- select, based at least partly on a price of the first item, a score generation function for calculating a price compatibility score that represents a degree to which the first and second items are compatible in price, wherein the score generation function is selected from a plurality of score generation functions, each of which corresponds to a different respective price range;
- calculate the price compatibility score using the selected score generation function; and
- determine, based at least partly on the price compatibility score, to use the item-to-item mapping as a basis for recommending the second item to a user.

18. The non-transitory computer storage of claim 17, wherein the executable code additionally instructs the computer system to select, based at least partly on the price compatibility score, an amount of weight to give to the item-to-item mapping in generating item recommendations.

19. The non-transitory computer storage of claim 17, wherein the executable code directs the computer system to calculate the price compatibility score by a method that comprises:
- generating the price compatibility score with a first score generation function when the price of the first item is below a first threshold;
- generating the price compatibility score with a second score generation function when the price of the first item is above a second threshold that is higher than the first threshold; and
- generating the price compatibility score using a third score generation function when the price of the first item is neither below the first threshold nor above the second threshold.

20. The non-transitory computer storage of claim 17, wherein the price of the second item is lower than the price of the first item.

21. Non-transitory computer storage that stores executable instructions that direct a computer system to perform a process that comprises:
- detecting a behavior-based relationship between a first item represented in an electronic catalog and a second item represented in the electronic catalog, said behavior-based relationship based on user activity data reflective of item selections of a plurality of users;
- selecting, based at least partly on a price of the first item, a price-compatibility score generation function from a plurality of price-compatibility score generation functions, each of which corresponds to a different respective price range;
- calculating, with the selected price-compatibility score generation function, a price compatibility score that represents a degree to which the first and second items are compatible in price;
- determining, based at least partly on the price compatibility score, to map the first item to the second item in an item-to-item mapping structure; and
- after determining to map the first item to the second item, using the item-to-item mapping structure to select items to recommend to users.

22. The non-transitory computer storage of claim 21, wherein selecting the price-compatibility score generation function comprises comparing the price of the first item to a price threshold that delineates two of the price ranges.

23. The non-transitory computer storage of claim 21, wherein selecting items to recommend comprises selecting one or more items to display on an item detail page corresponding to the first item.

24. The non-transitory computer storage of claim 21, in combination with the computer system, wherein the computer system is configured to generate, by execution of the instructions, said item-to-item mapping structure based on recorded user activity data of multiple thousands of users.

* * * * *